(12) United States Patent
Bradbrook et al.

(10) Patent No.: US 7,878,005 B2
(45) Date of Patent: Feb. 1, 2011

(54) GAS TURBINE ENGINE

(75) Inventors: Stephen John Bradbrook, Bristol (GB); Brian Davis, Bristol (GB); Richard James Wilson, Stoke on Trent (GB)

(73) Assignee: Rolls-Royce PLC, London (GB)

( * ) Notice: Subject to any disclaimer, the term of this patent is extended or adjusted under 35 U.S.C. 154(b) by 730 days.

(21) Appl. No.: 11/898,591

(22) Filed: Sep. 13, 2007

(65) Prior Publication Data
US 2008/0095615 A1 Apr. 24, 2008

(30) Foreign Application Priority Data
Oct. 24, 2006 (GB) ................... 0621074.4

(51) Int. Cl.
*F02C 7/275* (2006.01)
(52) U.S. Cl. ....................... 60/788; 60/226.1
(58) Field of Classification Search ................ 60/226.1, 60/226.3, 786–789
See application file for complete search history.

(56) References Cited

U.S. PATENT DOCUMENTS

| | | | | |
|---|---|---|---|---|
| 3,476,486 A * | 11/1969 | Chilman et al. | ............... | 415/68 |
| 3,769,797 A * | 11/1973 | Stevens | ...................... | 60/226.1 |
| 4,010,608 A * | 3/1977 | Simmons | .................... | 60/226.3 |
| 5,044,153 A * | 9/1991 | Mouton | .................... | 60/39.093 |
| 5,694,768 A * | 12/1997 | Johnson et al. | ............ | 60/226.3 |
| 5,845,482 A * | 12/1998 | Carscallen | .................... | 60/785 |
| 6,901,739 B2 * | 6/2005 | Christopherson | .......... | 60/226.3 |
| 7,216,475 B2 * | 5/2007 | Johnson | ...................... | 60/226.1 |
| 2004/0070211 A1 * | 4/2004 | Franchet et al. | ............... | 290/43 |
| 2006/0108807 A1 | 5/2006 | Bouiller et al. | | |
| 2007/0245709 A1 * | 10/2007 | Dooley | ........................ | 60/226.1 |
| 2008/0271431 A1 * | 11/2008 | Porte | .......................... | 60/226.1 |

FOREIGN PATENT DOCUMENTS

| GB | 2 118 248 A | 10/1983 |
|---|---|---|
| JP | A 2000-220524 | 8/2000 |
| WO | WO 2006/060014 A1 | 6/2006 |

* cited by examiner

*Primary Examiner*—Michael Cuff
*Assistant Examiner*—Phutthiwat Wongwian
(74) *Attorney, Agent, or Firm*—Oliff & Berridge, PLC

(57) ABSTRACT

A bypass turbofan gas turbine engine is started by an electric starter motor that is mounted directly about a downstream end or upstream of the low pressure spool of the engine. This causes air to be driven by a fan through a bypass duct around the engine casing. Closures close to substantially seal an outlet of the bypass duct, and the air is directed into a combustion chamber of the engine and through the turbines causing the high pressure spool to pick up speed for starting.

13 Claims, 5 Drawing Sheets

GAS TURBINE ENGINE

The present invention relates to a gas turbine engine and particularly but not exclusively to an apparatus and method for starting a bypass turbofan gas turbine engine.

In order to start a gas turbine engine, for example, a bypass turbofan gas turbine engine, it is necessary to accelerate the high pressure (HP) spool to a speed high enough for sufficient air pressure and mass flow to be developed in the combustion chamber for fuel metered into the combustion chamber to be ignited. After ignition of the fuel, fuel flow is increased until the engine reaches idle speed.

In one starting arrangement, pressurised air is impinged onto the HP turbine blades to impart sufficient momentum for the turbine to rotate. This arrangement requires pressurised air to be independently generated, for example, by means of a dedicated auxiliary air compressor.

In another starting arrangement, the HP spool driven by an electric starter motor, which is positioned externally of the engine. The starter motor is connected to the HP spool through gears and a clutch mechanism.

The invention seeks to provide a starting arrangement for a gas turbine engine, which does not require the use of an external motor and gearing or an auxiliary compressor or other externally mounted starting device.

According to the present invention there is provided a gas turbine engine comprising an engine casing disposed around a low pressure spool, a high pressure spool and a combustion chamber; a bypass casing disposed around the engine casing, a bypass duct disposed between the engine casing and the bypass casing, a fan for supplying air to the bypass duct and a starter motor for rotating the fan on engine start-up, characterised in that the engine casing is provided with closable apertures which, when open, provide communication between a region of the bypass duct and the interior of the engine casing upstream of the combustion chamber.

Preferably a first closure means is provided to reduce the flow area of an outlet of the bypass duct or to substantially seal an outlet of the bypass duct between the bypass casing and the engine casing.

Preferably, a second closure means is disposed in the engine casing for allowing air to flow from the bypass duct through the aperture into the combustion chamber when the second closure means is in an open position and for sealing the aperture when the second closure means is in a closed position.

Preferably, the first closure means is disposed downstream of the second closure means.

The second closure means may be biased to a closed position in which the bypass duct is sealed from the combustion chamber.

Preferably, the second closure means is positioned to allow airflow passing through the bypass duct to flow into the engine at the upstream end of the combustion chamber of the engine.

When the electric starter motor rotates the LP spool, the airflow generated by a LP fan at the upstream end of the engine takes the path of least resistance, ie passes through the bypass duct. The airflow through the engine is therefore minimal. In order to maximise this core airflow, the first closure means seals the outlet of the bypass duct and the second closure means opens the bypass duct to the combustion chamber and turbines of the engine.

In one aspect of the invention the first closure means is configurable to allow airflow from the bypass duct through the aperture into the combustion chamber when the closure means is in a first position for starting; and to allow airflow through the outlet of the bypass duct and to seal the combustion chamber from the bypass duct when the closure means is in a second position for engine operation.

The closure means may have a single actuated member.

In all embodiments of the invention, the starter motor may operate as a generator when the engine is operating.

The engine may be a multi-spool bypass turbofan engine.

According to a further aspect of the present invention there is provided a method of starting a gas turbine engine comprising an engine casing disposed around at least one low pressure spool, a high pressure spool and a combustion chamber (24); a bypass casing (30) disposed around the engine casing (28), a bypass duct (32) disposed between the engine casing (28) and the bypass casing (30), characterised by directing airflow from the bypass duct (32) into the upstream end of a combustion chamber (24) of the engine (10) through at least one closeable aperture (31) in the engine casing (28).

Preferably, the method further comprises reducing the flow area of an outlet of the bypass duct or substantially sealing an outlet of the bypass duct, and allowing airflow passing through the bypass duct to be directed into the combustion chamber.

Ideally, in all embodiments of the invention, airflow can be directed initially into the engine onto the turbine blades without passing through the HP compressor.

For a better understanding of the present invention, and to show more clearly how it may be carried into effect, reference will now be made, by way of example, to the accompanying drawings, in which:—

Figure 1:
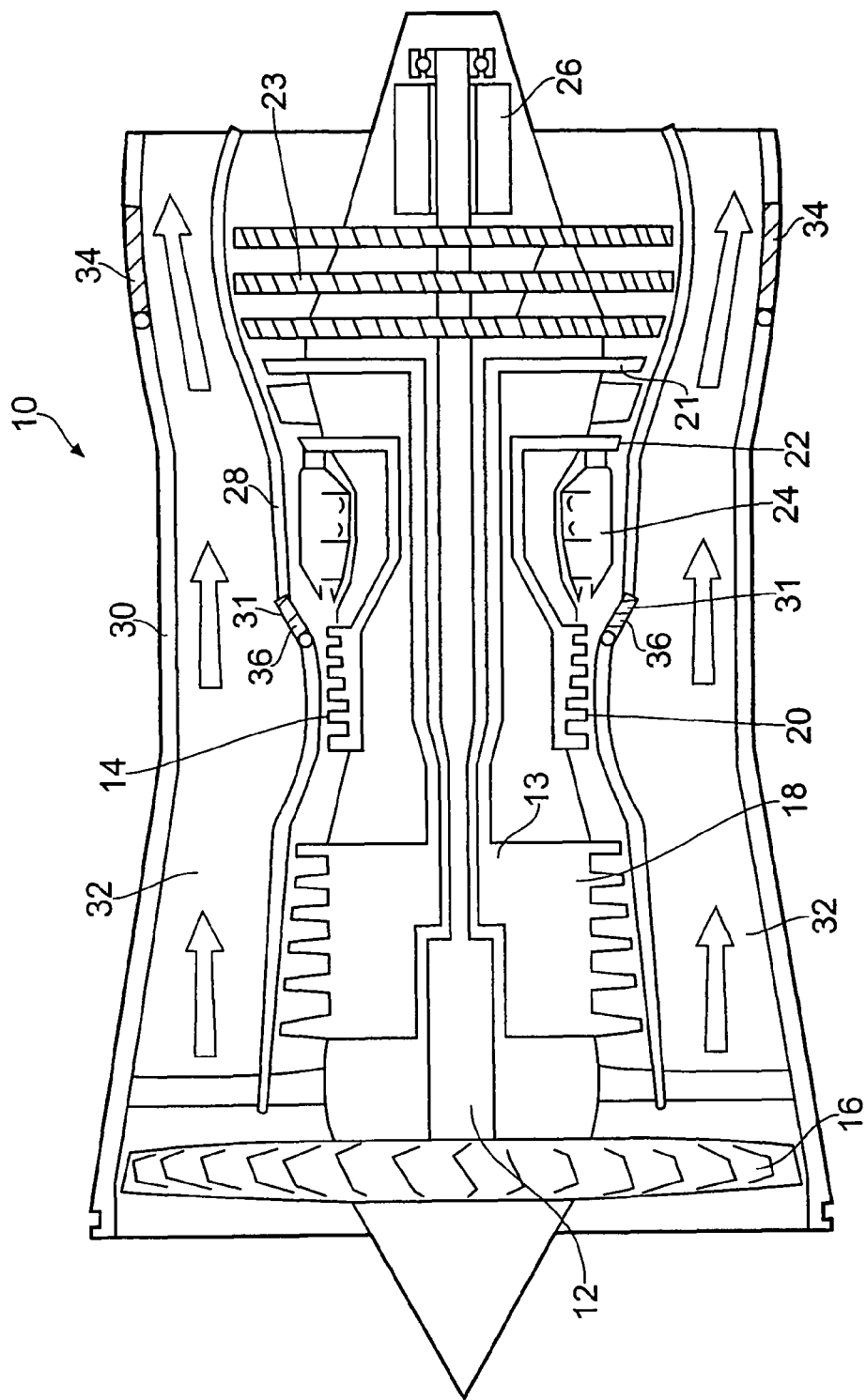
FIG. 1 shows a schematic cross-sectional view through a multi-spool gas turbine engine in accordance with the invention in an initial stage in a starting procedure.

Referring firstly to FIG. 1, a first embodiment of multi-spool gas turbine engine is indicated generally at 10. The engine 10 is conventional in that it comprises three spools, that is to say it includes a low pressure (LP) spool 12, an intermediate pressure (IP) spool 13, and a high pressure (HP) spool 14. However the invention may equally be applied to any single spool, twin spool or multi spool engine arrangement. A fan 16 is mounted on the front or upstream end of the LP spool, IP booster stage blades 18 are mounted on the IP spool 13, and a compressor 20 is mounted on the HP spool 14. HP turbine blades 22 are connected to the compressor 20, ie on the HP spool, IP turbine blades 21 are mounted on the IP spool 13 and LP turbine blades 23 are mounted on the LP spool. A combustion chamber 24 is downstream of the compressor 20, but upstream of the turbine blades 22, 21, 23.

An electrically driven starter motor 26 is mounted directly about the downstream end of the LP spool 12, which may be axially extended for this purpose, within the nozzle of the engine. The starter motor 26 may alternatively be mounted directly about the upstream end of the LP spool 12, within the nose cone of the engine. An engine casing 28 surrounds the IP booster stage blades 18, the HP compressor 20, the combustion chamber 24 and the turbine blades 22, 21, 23. A bypass casing 30 surrounds the fan 16 and extends around and along the engine casing 28, creating a substantially annular bypass duct 32 between the engine casing 28 and the bypass casing 30.

A plurality of bypass duct closures 34, two of which are shown, are provided in the bypass casing 30 equi-spaced around the casing 30 at the downstream end of the engine, proximate the outlet of the bypass duct 32. The closures 34 are movable to seal the outlet of the bypass duct between the bypass casing 30 and the engine casing 28. The closures 34 comprise a plurality of actuated flaps. The seal made may be a complete seal (that is to say does not permit any leakage to the outlet of the bypass duct 32) or a partial seal (that is to say, it permits a controlled leakage to the outlet of the bypass duct 32). Alternatively the closures 34 may be moveable to reduce the flow area of the bypass duct 32.

Figure 2:
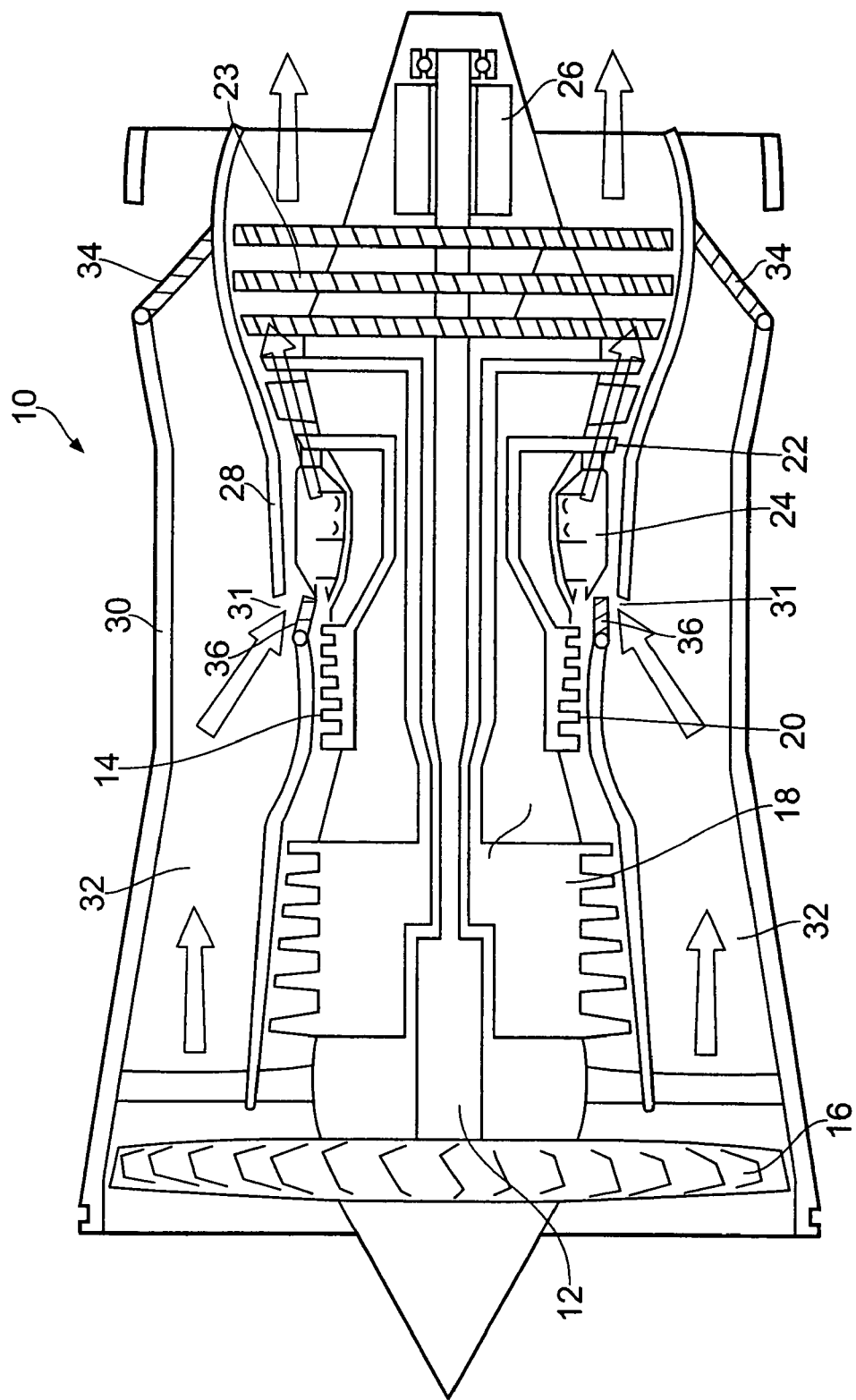
FIG. 2 shows a schematic cross-sectional view through the gas turbine engine of FIG. 1 in a second stage in the starting procedure.

A plurality of apertures 31 are disposed in the engine casing 28 at the upstream end of the combustion chamber 24. Engine casing closures 36 are mounted inside the engine casing 28 to cover and seal the apertures 31. When open, as shown in FIG. 2, the closures 36 allow air to pass through apertures 31 from the bypass duct 32 into the combustion chamber 24. The engine casing closures 36 are spring loaded to a closed position as indicated in FIG. 1, which shows the engine in an operating condition. Although two apertures 31 and engine casing closures 36 are shown, a plurality are provided, equi-spaced around the engine casing 28.

In order to start the engine 10, initially the bypass duct closures 34 and engine casing closures 36 are in the positions shown in FIG. 1, ie with the engine casing closures 36 closed and the bypass duct closures 34 open. The starter motor 26 operates to drive the LP spool, causing the fan 16 to push air through the engine. When the LP spool reaches a sufficient speed, the bypass duct closures 34 are moved to the position as shown in FIG. 2 such that they close, or partially close, the outlet from the bypass duct 32. As a result, air pressure in the bypass duct 32 between the fan and the engine casing closures 36 increases, causing the engine casing closures 36 to be opened against the spring force, allowing air to be directed from the bypass duct 32 through the apertures 31 into the upstream end of the combustion chamber 24 and through the turbines 22, 21, 23. The majority of air reaching the combustion chamber 24 has bypassed the high pressure compressor 20 by flowing through the bypass duct 32 and the apertures 31. The air travelling through the combustion chamber 24 impinges on the HP turbine with enough momentum to begin initial rotation of the HP spool.

Figure 3:
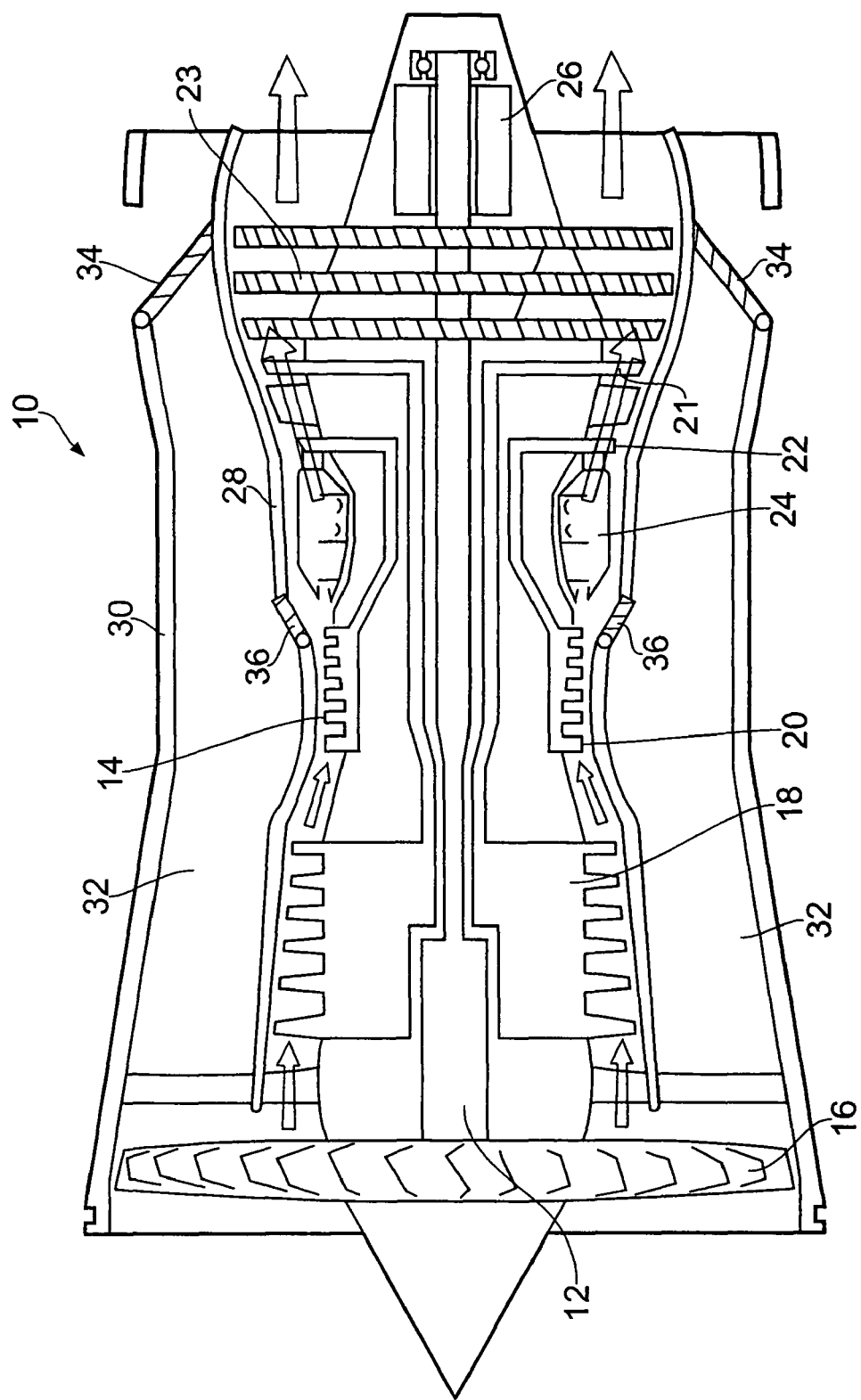
FIG. 3 shows a schematic cross-sectional view through the gas turbine engine of FIG. 1 in a third stage in the starting procedure.

The HP spool 14 begins to accelerate and draws more air in through the mouth of the engine core. This drawing in of more air results in continued acceleration of the HP spool 14 and raises the pressure in the combustion chamber 24. This pressure rise continues until the pressure reaches a level where it equals that of the air pressure in the bypass duct 32. By this point, the pressure difference across the engine casing closures 36 will have reduced to the extent that the engine casing closures close under the action of the springs against the engine casing 28. This produces the required seal to accommodate the continued pressure rise associated with the increasing speed of the HP spool 14. The bypass duct closures 34 are configured to prevent the build up of pressure in the bypass duct 32. That is to say they may remain closed, as shown in FIG. 3, or may be partially open, or may oscillate between being fully open, partially open and/or closed as required to prevent a pressure build up which results in aerodynamic instabilities that affect the operation of the fan 16.

If the bypass duct closures 34 were now fully opened, the high pressure spool 14 may begin to slow down. Therefore, the bypass duct closures 34 remain closed, or at least partially closed, until successful ignition of fuel air mixture in the combustion chamber 24 can be achieved, or even longer to ensure that idle speed can be reached in the same way as with a conventional starting arrangement after ignition. Thereafter, the bypass duct closures 34 are opened and the engine 10 operates in the condition shown in FIG. 1.

In an alternative embodiment to that described above in relation to FIGS. 1 to 3, the closures 34,36 are activated and controlled hydraulically, pneumatically, electrically or by some other such suitable method.

Figure 4:
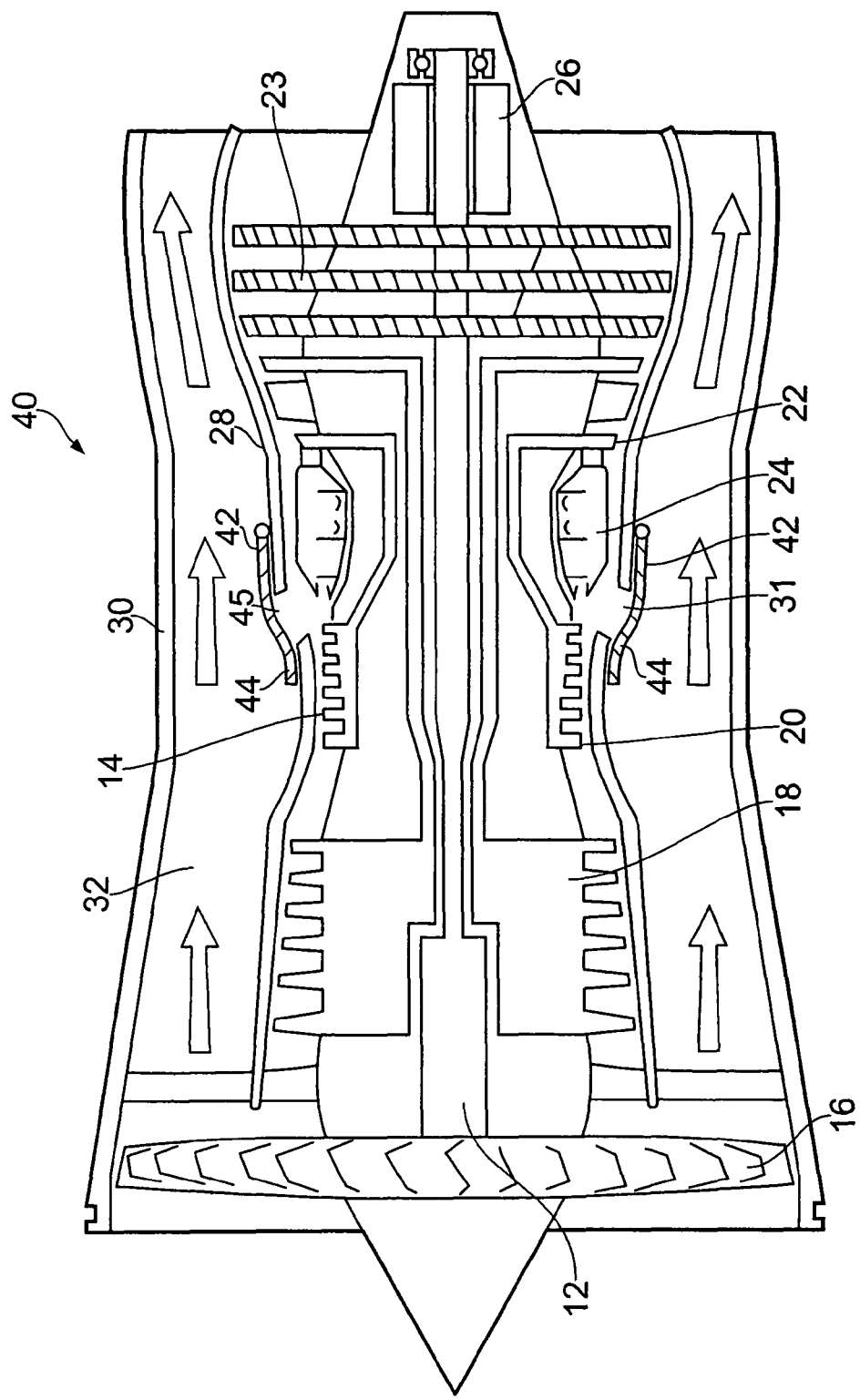
FIG. 4 shows a schematic cross-sectional view through an alternative embodiment of multi-spool gas turbine in an operating condition in accordance with the invention.
Figure 5:
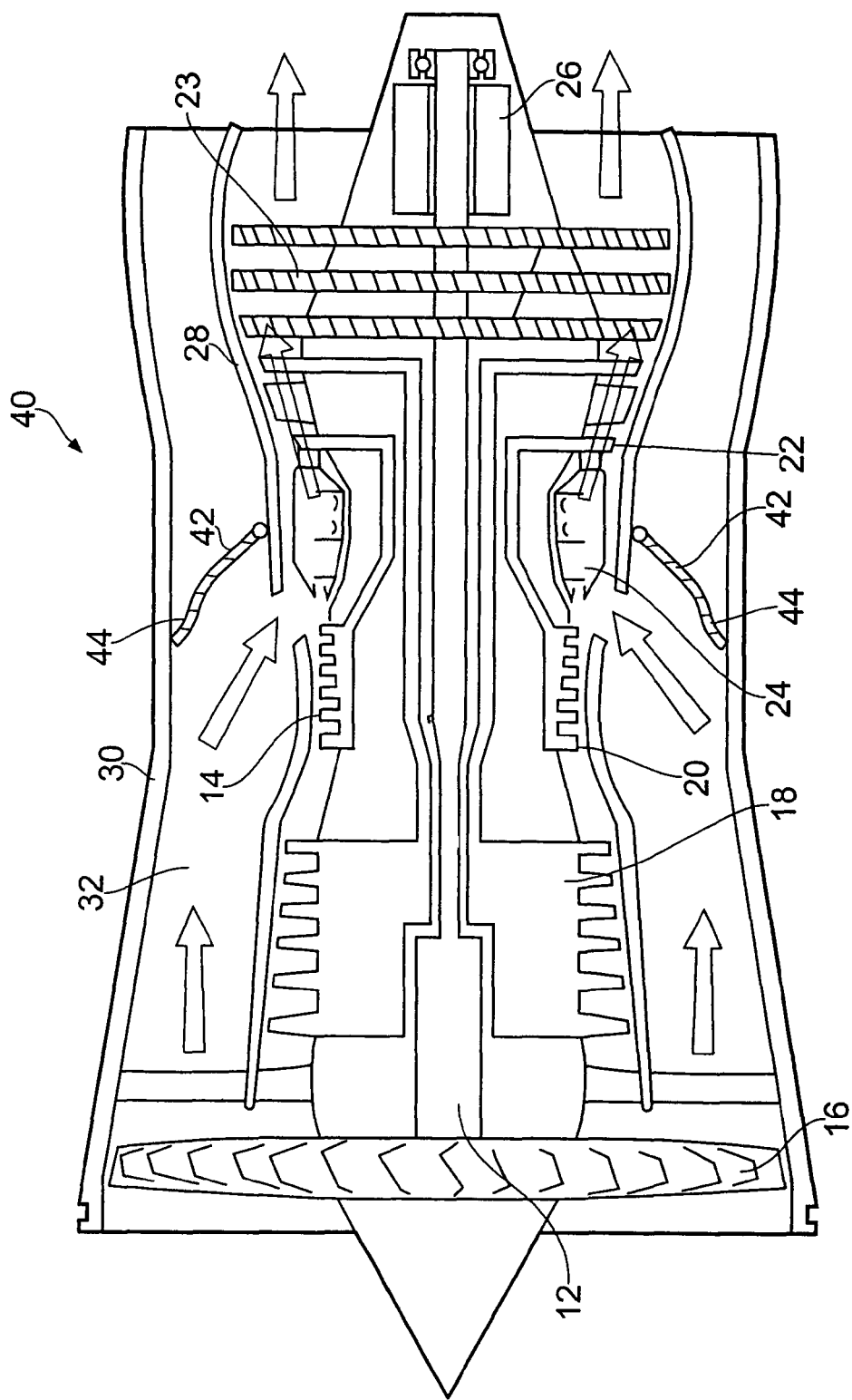
FIG. 5 shows a schematic cross-sectional view through the engine of FIG. 4 in a starting condition.

Referring now to FIGS. 4 and 5, a second embodiment of a multi spool gas turbine engine is indicated at 40. Common references numerals have been used to designate parts in common with the first embodiment described. In this embodiment, the bypass duct closures 34 and engine casing closures 36 of the previous embodiment described are integrated into actuated closures 42, each comprising a single flap 44. A plurality of these flaps 44 are hinged to the engine casing 28 and are disposed equi-spaced about the bypass duct 32. When activated, for example either hydraulically, pneumatically or electrically, the flap 44 of each closure 42 moves between a normal operating position, in which it covers the aperture 31 in the engine casing 28 near the combustion chamber 28 and leaves the bypass duct 32 unobstructed, and a starting position (FIG. 5), in which the aperture 31 is exposed allowing air flow into the combustion chamber 24 and substantially closing the bypass duct 32 at a position downstream of the aperture 31.

The engine 40 is started in the same way as the engine 10, save that once the LP spool 12 has reached a sufficient speed with the closures 42 in the starting position, the closures are closed for ignition, ie the combustion chamber 24 is sealed from the bypass duct 32.

The invention is intended to include any physical arrangement for substantially sealing the outlet of the bypass duct 32 and allowing air flow into the combustion chamber 24 and through the turbine blades 22, 23 of the engine. When operating, the starter motor 26 functions as a generator.

In use on a jet aircraft, the invention also gives the advantage of providing means for varying core and bypass mixing areas by operation of the closures for optimising mixing throughout the flight envelope.

The invention claimed is:

1. A gas turbine engine comprising
  an engine casing disposed around a compressor and a combustion chamber; and
  a bypass casing disposed around the engine casing, a bypass duct disposed between the engine casing and the bypass casing, and a fan for supplying air to the bypass, wherein
  the engine casing is provided with closable apertures which, when open, provide communication between a region of the bypass duct and the interior of the engine casing upstream of chamber and allow airflow from the bypass duct through the closable apertures into the combustion chamber and wherein
  an inlet to the bypass duct remains unobstructed when the closable apertures are open and closed.

2. A gas turbine engine as claimed in claim 1 wherein a first closure means is provided to reduce the flow area of an outlet of the bypass duct or to substantially seal an outlet of the bypass duct between the bypass casing and the engine casing.

3. A gas turbine engine as claimed in claim 2, characterised in that a second closure means is disposed in the engine casing, for allowing air to flow from the bypass duct through the aperture into the combustion chamber when the second closure means is in an open position and substantially sealing the aperture when the second closure means is in a closed position.

4. A gas turbine engine as claimed in claim 3 characterised in that the first closure means is disposed downstream of the second closure means.

5. A gas turbine engine as claimed in claim 3, characterised in that the second closure means is biased to a closed position in which the bypass duct is sealed from the combustion chamber.

6. A gas turbine engine as claimed in claim 3, characterised in that the second closure means is positioned to allow airflow passing through the bypass duct into the combustion chamber at the upstream end of the combustion chamber.

7. A gas turbine engine as claimed in claim 1, comprising a starter motor for rotating the fan on engine start-up.

8. A gas turbine engine as claimed in claim 7, wherein the starter motor is mounted directly about a low pressure spool.

9. A gas turbine engine as claimed in claim 2, characterised in that the first closure means is configurable to allow airflow from the bypass duct through the aperture into the combustion chamber when the closure means is in a first position for starting; and to allow airflow through the outlet of the bypass duct and to seal the combustion chamber from the bypass duct when the closure means is in a second position for engine operation.

10. A gas turbine engine as claimed in claim 2, characterised in that the closure means has a single actuated member.

11. A gas turbine engine as claimed in claim 7, characterised in that the starter motor operates as a generator when the engine is operating.

12. A gas turbine engine as claimed in claim 1, characterised in that the engine is a multi-spool bypass turbofan engine.

13. A gas turbine engine as claimed in claim 7, wherein the starter motor is an electrically driven starter motor.

* * * * *